United States Patent [19]

Nash

[11] 4,409,965
[45] Oct. 18, 1983

[54] SOLAR ENERGY CONVERSION APPARATUS

[75] Inventor: Stanley G. Nash, Great Falls, Mont.

[73] Assignee: Sun Wise, Inc., Great Falls, Mont.

[21] Appl. No.: 455,405

[22] Filed: Jan. 3, 1983

Related U.S. Application Data

[63] Continuation-in-part of Ser. No. 329,297, Dec. 10, 1981, Pat. No. 4,366,808, which is a continuation-in-part of Ser. No. 80,694, Oct. 1, 1979, abandoned.

[51] Int. Cl.³ .............................................. F24J 3/02
[52] U.S. Cl. .................................. 126/450; 126/445; 126/430
[58] Field of Search ............... 126/417, 430, 429, 432, 126/436, 444, 445, 446, 449, 450, 400, 441; 165/48 S

[56] References Cited

U.S. PATENT DOCUMENTS

| | | | |
|---|---|---|---|
| 3,965,887 | 6/1976 | Gramer et al. | 126/444 |
| 3,987,786 | 10/1976 | Keyes et al. | 126/432 |
| 4,103,675 | 8/1978 | Baron et al. | 126/450 |
| 4,154,222 | 5/1979 | Yu | 126/450 |
| 4,266,531 | 5/1981 | Behrendt et al. | 126/449 |
| 4,271,823 | 6/1981 | Erb | 126/441 |
| 4,281,639 | 8/1981 | Kuronen | 126/449 |
| 4,282,856 | 8/1981 | Stehl | 126/449 |
| 4,297,989 | 11/1981 | Wozny | 126/449 |
| 4,297,990 | 11/1981 | Allisbaugh | 126/450 |
| 4,313,429 | 2/1982 | McAlaster | 126/450 |
| 4,316,452 | 2/1982 | Levine | 126/450 |
| 4,353,357 | 10/1982 | Nelson | 126/441 |
| 4,366,808 | 1/1983 | Nash | 126/450 |

Primary Examiner—James C. Yeung
Attorney, Agent, or Firm—Arthur L. Urban

[57] ABSTRACT

Solar energy conversion apparatus including a housing portion, an energy absorbing portion, a fluid directing portion and a cover portion; the housing portion including a molded plastic pan member including a base section, the pan member including outwardly inclined sidewall sections having spaced inner and outer wall sections with a top section including an outwardly extending flange section and an inwardly extending slotted frame section; the energy absorbing portion including a conductive metal liner member positioned within the housing portion and resting on the upper surfaces of the spacer sections, a conductive metal separator section extending between the liner sidewall sections adjacent the upper ends thereof and enclosing the liner member; the fluid directing portion including a plurality of parallel spaced longitudinal baffle members arranged in a staggered relationship to provide a tortuous fluid path through the apparatus, an inlet opening and an outlet opening to the tortuous path, the baffle members extending upwardly from the liner bottom to the separator section; the cover portion including transparent impact resistant flat and dome members, the edges of the flat member being secured to the top section, the dome member being disposed over the flat member with its edges engaged with the flange section slots, the dome member including flat sections extending upwardly at an angle of 20° to 30° and a convex central section joining the flat sections.

19 Claims, 4 Drawing Figures

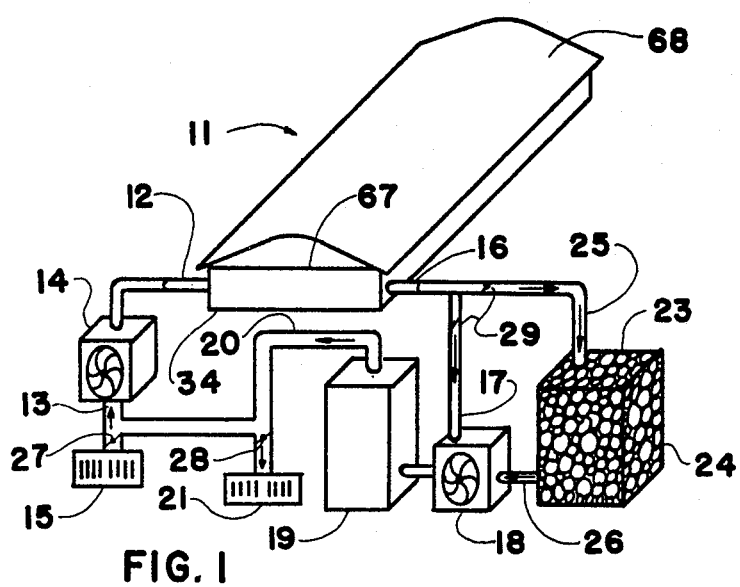

SOLAR ENERGY CONVERSION APPARATUS

This application is a continuation-in-part of pending application Ser. No. 329,297, filed Dec. 10, 1981, now U.S. Pat. No. 4,366,808, which is a continuation-in-part of abandoned application Ser. No. 80,694, filed Oct. 1, 1979.

This invention relates to a novel apparatus for the utilization of solar energy and more particularly relates to a new apparatus for converting solar energy into energy forms which are capable of being used more conveniently.

With the recent large increases in the cost of conventional energy sources such as electricity and petroleum, both in the United States and foreign countries, much attention is being given to alternative energy sources. One energy source which is especially appealing is solar energy because of its unlimited supply and the absence of pollution and other ecological problems with solar energy.

Many of the solar energy systems heretofore proposed involve the absorption of heat from the sun by gases or liquids and the circulation thereof to the areas requiring heat. If the heat is not fully needed when the sun is shining, the heated gases or liquids can be circulated to storage chambers where the heated media is stored or the gas or liquid is passed over a heat absorbing material such as a bed of rocks which will absorb and store the heat energy for subsequent recovery.

The gas or liquid generally absorbs the solar energy by exposure to the rays of the sun. Since solar energy itself does not cost anything, the principal costs in solar energy systems are the initial expense of the solar energy converting equipment and the subsequent expense of operating and maintaining the equipment. Ideally, it is desirable to increase the temperature of the gas or liquid as much as possible during each pass through the equipment so a minimum amount of equipment will be required to accomplish a desired amount of heating. Thus, improving the operating efficiency of the solar energy conversion system can result in a significant savings both in capital investment and in operating costs.

Much effort has been expended on ways to improve the operating efficiency of solar energy systems. It has been proposed to circulate a gas or liquid through a closed system in which a portion of the system is exposed to the sun. Some systems utilize black chambers in an attempt to increase the amount of heat energy absorbed. Other systems have transparent portions in their solar energy converting sections.

Another consideration in the design of solar energy conversion systems is how the system will be affected when the sun is not shining such as at night and on cloudy or rainy days. Most systems that are efficient when absorbing solar energy also release large amounts of energy when the sun is not shining.

In view of the conflicting objectives of high efficiency of solar energy absorption and low heat loss when the sun is not shining, designs of solar energy conversion systems have included a variety of complicated devices in an attempt to accomplish both objectives. Some systems employ movable panels to cover the absorption equipment when the sun is not shining. Movement of the panels is controlled by sensors that activate motors to move the panels.

While some of the designs may reduce the loss of heat from the system when the sun is not shining, they are very complicated and greatly increase the cost of the system. Also, such designs are subject to failure and increase operating and maintenance costs.

The present invention provides a novel apparatus for converting solar energy to a more useable form with improved operating efficiency. The apparatus provides efficient utilization of solar energy with low heat loss when the sun is not shining. In addition, the solar energy converter of the invention does not require movable panels or other movable components to achieve these results. Further, the apparatus does not require sensors or motors since there are no movable panels to be changed.

The solar energy converter of the invention is suitable for use with gases or liquids and combinations thereof. Moreover, the converter can be combined with existing heating systems. The conversion apparatus of the invention is simple in design and is an active system without moving or driven parts. Also, the apparatus can be fabricated from commercially available materials relatively inexpensively.

Other benefits and advantages of the novel solar energy converter of the present invention will be apparent from the following description and the accompanying drawings in which:

FIG. 1 is a schematic illustration of a heating system utilizing one form of the solar energy conversion apparatus of the invention;

FIG. 2 is an enlarged top view in section of the solar energy conversion apparatus shown in FIG. 1;

FIG. 3 is a sectional view of the solar energy conversion apparatus shown in FIG. 2 taken along line 3—3 thereof; and FIG. 4 is an enlarged fragmentary sectional view of the solar energy conversion apparatus shown in FIG. 2 taken along line 4—4 thereof.

As shown in FIG. 1 of the drawings, one form of the solar energy conversion apparatus 11 of the invention is combined with a conventional hot air heating system. Inlet 12 of conversion apparatus 11 is connected by a duct 13 including a fan 14 to a return register 15 located in a room of a house. Outlet 16 of the converter 11 is connected by a duct 17 to a fan 18 associated with a furnace 19. A duct 20 leads from furnace 19 to a supply register 21 located in a room of the house. A storage chamber 23 having a bed of rocks 24 or similar material therein is connected with fan 18 and furnace 19 through ducts 25 and 26.

Solar energy conversion apparatus 11 of the invention includes a housing portion 31, an energy absorbing portion 32, a fluid directing portion 33 and a cover portion 34. Advantageously, the converter 11 has a length about twice the width thereof and preferably about four feet by eight feet.

The housing portion 31 includes a molded plastic pan member 36. The pan member 36 includes a base section 37. The base section 37 includes upwardly extending spacer sections 38. The spacer sections 38 are spaced from one another and preferably extend from one end of the pan member 36 to the other end thereof. Insulation 39 fills the spacer sections 38 and covers the exposed surface of the base section 37. The base section 37 also includes downwardly extending support sections 40. Preferably, the insulation covering the base section 37 has a depth less than the height of the spacer sections 38.

Pan member 36 further includes outwardly inclined sidewall sections 42. The inclination advantageously is less than about 10°. The sidewall sections 42 include spaced inner and outer wall sections 43 and 44, respectively. The upper edges of the inner and outer wall sections 43 and 44 are joined by top section 45. The top section 45 includes an outwardly extending flange section 46 which advantageously also extends upwardly. An inwardly extending slotted frame section 47 is located on the flange section 46. Insulation 48 fills the space between the inner and outer wall sections 43 and 44. The insulation in the spacer sections and the sidewall sections preferably is a foam insulation.

The energy absorbing portion 32 of the apparatus 11 includes a conductive metal liner member 50. The liner member 50 is positioned within the housing portion 31. The liner member 50 includes a substantially flat bottom section 51. The liner bottom section 51 rests on the upper surfaces 52 of the housing spacer sections 38.

The edges of the bottom section 51 terminate adjacent the housing sidewall sections 42. The liner member 50 includes sidewall sections 53 extending from the edges of the liner bottom section 51 upwardly to a point closely adjacent to the top section 45 of the housing sidewall sections 42. Flange section 54 preferably extends outwardly from the upper edges of the liner sidewall sections 53 and bears on the top section 45 of the pan member 36.

The liner member 50 also includes a conductive metal separator section 55. The separator section 55 extends between the sidewall sections 53 adjacent the upper ends thereof. In this way, the separator section forms an enclosed chamber in the liner member 50.

The energy absorbing portion 32 advantageously further includes conductive metal absorber members 56. The absorber members 56 cover the exposed surface of the liner bottom section 51. The absorber members 56 include a plurality of spaced risers or undulations 57. The undulations 57 are disposed transversely of baffle members 58 of the fluid directing portion 33 described hereafter. The liner member 50 and the absorber members 56 preferably are formed of aluminum.

A plurality of spaced baffle members 58-60 are disposed longitudinally of the pan member 36. The baffle members 58-60 are arranged substantially parallel to one another in a staggered relationship. Alternating baffles of the staggered relationship each have one end adjacent to a common end 62 of the liner member 50. The other end of each alternating baffle is spaced from the opposite end 63 of the liner member 50. Thus, alternating baffles 58 and 60 are attached to liner end 62 and have their opposite ends spaced from liner end 63. Likewise, baffle 59 is attached to liner end 63 and the opposite end thereof is spaced from liner end 62. Advantageously, three baffles are employed formed of aluminum.

This alternating arrangement of the baffles 58-60 provides a tortuous fluid path through the apparatus 11. The inlet opening 64 is located adjacent one end of the tortuous path and an outlet opening 65 is located adjacent the opposite end of the tortuous path. The inlet 64 and the outlet 65 preferably are located at a common end of the apparatus. The baffles 58-60 extend upwardly from the liner bottom section 51 to the separator section 55. As pointed out above, the raised undulations 57 of the absorber members 56 preferably are disposed transversely of baffle members 58-60, that is, perpendicular to the tortuous path through the apparatus 11.

The cover portion 34 of the energy conversion apparatus 11 of the invention includes a transparent flat member 67 and a similar dome member 68. The flat and dome members 67 and 68 are formed of impact resistant material. Advantageously, the flat and dome members are formed of polycarbonate plastic.

The flat member 67 rests on the peripheral top section 45 of the pan member 36. The edges of the flat member 67 are secured to the top section 45 around substantially the entire edge thereof. This attachment of the flat member to the top section advantageously is through a peripheral frame section 69. The frame section includes an inwardly extending slot 70 which engages the edge of the flat member.

The dome member 68 is disposed over the flat member 67. The dome member 68 as shown extends beyond the edges of the flat member. The edges of the dome member 68 fit into and are engageable with slots 47 of the flange section 46 of the pan sidewall sections 42.

The dome member 68 includes substantially flat side sections 73 and 74. The flat sections 73 and 74 extend upwardly from the longitudinal edges 75 and 76 of the pan member 36. Preferably, the flat sections extend upwardly toward one another at angles between about 20° and 30° to the flat member 67.

The flat side sections 73 and 74 are joined by a convex central section 77. The convex section 77 extends longitudinally of the apparatus 11. Thus, the ridge of the convex section 77 is substantially aligned with the baffles 58-60. The distance between the ridge of the convex central section 77 and the flat member 67 preferably is greater than the height of the housing portion 31 of the conversion apparatus 11.

In the operation of the heating system shown in FIGS. 1-4 of the drawings, air is withdrawn from a room of a house through return register 15 and duct 13 by fan 14 and transferred to solar energy converter 11. Converter 11 may be mounted on the roof of the house or a similar location which provides good exposure to the sun. The unique configuration of dome member 68 provides a high level of heating even when the sun is not directly overhead as compared with previous solar collectors.

The air circulating through converter 11 around baffles 58-60 is heated by the rays of the sun shining thereon. The heated air exits through duct 17 and passes through fan 18 associated with furnace 19. The heated air leaves furnace 19 and is forced by fan 18 through duct 20 and supply register 21 into the room.

The air circulating through the converter 11 is confined within the chamber formed by liner member 50 and separator section 55. This arrangement keeps air contaminants from soiling the transparent flat member 67 and thereby maintains the efficiency of the apparatus at a high level even after years of use.

If heat is not required in the rooms of the house, the heated air may be diverted by suitable dampers 27, 28 and 29 in ducts 13, 17, 20 and 25 into storage chamber 23. The heated air passes over rocks 24 within chamber 23 transferring heat to the rocks. The air then may be recirculated to converter 11. If heat is required in the house when the sun is not shining, air is withdrawn from the rooms and circulated through storage chamber 23. The air passing over rocks 24 therein picks up heat from the rocks and is forced by fan 18 through duct 20 and supply register 21 into the room.

The above description and the accompanying drawings show that the present invention provides a novel solar energy conversion apparatus for changing solar energy into a more useable form. Furthermore, the conversion apparatus of the invention provides efficient utilization of solar energy with low heat loss when the sun is not shining. The solar energy converter does not require movable panels or the sensors and motors needed to operate them.

The solar energy converter of the present invention is suitable for use with gases or liquids and combinations thereof. In addition, the converter can be combined with existing heating systems. Moreover, the conversion apparatus is simple in design without moving or driven parts. Also, the conversion apparatus of the invention can be fabricated from commercially available materials relatively inexpensively.

It will be apparent that various modifications can be made in the particular solar energy conversion apparatus described in detail and shown in the drawings within the scope of the invention. For example, the size and configuration of the converter can be changed to meet specific requirements. Also, more than one converter can be used in parallel or series to increase the capability of the system. In addition, the arrangement of the inlets and outlets and the baffles can be different as desired. Therefore, the scope of the invention is to be limited only by the following claims.

What is claimed is:

1. Solar energy conversion apparatus including a housing portion, an energy absorbing portion, a fluid directing portion and a cover portion; said housing portion including a molded plastic pan member, said pan member including a base section, said base section including upwardly extending spacer sections, said spacer sections being spaced from one another, insulation covering the exposed surface of said base section, said base section including downwardly extending support sections, said pan member including outwardly inclined sidewall sections, said sidewall sections including spaced inner and outer wall sections, the upper edges of said inner and outer wall sections being joined by a top section including an outwardly extending flange section with an inwardly extending slotted frame section extending from said flange section, insulation extending filling the space between said inner and outer wall sections; said energy absorbing portion including a conductive metal liner member positioned within said housing portion, said liner member including a bottom section, said liner bottom section resting on the upper surfaces of said housing spacer sections, the edges of said bottom section terminating adjacent said housing sidewall sections, said liner member also including sidewall sections extending from the edges of said liner bottom section upwardly to a point closely adjacent to the top section of said housing sidewall sections, a conductive metal separator section extending between said liner sidewall sections adjacent the upper ends thereof and enclosing said liner member; said fluid directing portion including a plurality of spaced baffle members, said baffle members being disposed longitudinally of said pan member and substantially parallel to one another, said baffle members being arranged in a staggered relationship with alternating baffles each having one end adjacent to a common end of said liner member and the other end of each alternate baffle being spaced from the opposite end of said liner member to provide a tortuous fluid path through said apparatus, an inlet opening adjacent one end of said tortuous path and an outlet opening adjacent the opposite end of said tortuous path, said baffle members extending upwardly from said liner bottom section to said separator section; said cover portion including transparent impact resistant flat and dome members, said flat member extending between said top section of said pan member, the edges of said flat member being secured to said top section around substantially the entire edge thereof, said dome member being disposed over said flat member and extending beyond the edges of said flat member, the edges of said dome member being engageable with said inwardly extending slots of said flange section of said pan sidewall sections, said dome member including substantially flat sections extending upwardly from the longitudinal edges of the pan member toward one another and a convex central section joining said upwardly extending flat sections extending longitudinally of said apparatus.

2. Solar energy conversion apparatus according to claim 1 wherein said sidewall sections of said pan member are inclined to the vertical less than about 10°.

3. Solar energy conversion apparatus according to claim 1 wherein said insulation in said sidewall and spacer sections of said pan member is a foam.

4. Solar energy conversion apparatus according to claim 1 wherein said base-covering insulation has a depth less than the height of said spacer sections.

5. Solar energy conversion apparatus according to claim 1 wherein said spacer sections are elongated and extend from one end of said pan member to the other.

6. Solar energy conversion apparatus according to claim 1 wherein said bottom section of said liner member is substantially flat.

7. Solar energy conversion apparatus according to claim 1 wherein said sidewall sections of said liner member are substantially parallel to said sidewall sections of said pan member.

8. Solar energy conversion apparatus according to claim 1 including flange sections extending outwardly from the upper edges of said liner sidewall sections and bearing on said top section of said pan member.

9. Solar energy conversion apparatus according to claim 1 including conductive metal absorber members covering the exposed surface of said liner bottom section.

10. Solar energy conversion apparatus according to claim 9 wherein said absorber members include a plurality of spaced risers.

11. Solar energy conversion apparatus according to claim 10 wherein said risers of said absorber members are disposed transversely of said baffle members.

12. Solar energy conversion apparatus according to claim 10 wherein said risers are raised undulations.

13. Solar energy conversion apparatus according to claim 1 wherein said liner member, said absorber members and said baffle members are formed of aluminum.

14. Solar energy conversion apparatus according to claim 1 wherein said apparatus includes at least three baffle members.

15. Solar energy conversion apparatus according to claim 1 wherein said inlet and outlet openings are located adjacent a common end of said apparatus.

16. Solar energy conversion apparatus according to claim 1 wherein the edges of said flat member are secured to said top section through a peripheral frame section including an inwardly extending slot engageable with the edge of said flat member.

17. Solar energy conversion apparatus according to claim 1 wherein said transparent flat and dome members are formed of polycarbonate plastic.

18. Solar energy conversion apparatus according to claim 1 wherein the distance between the ridge of said convex central section of said dome member and said flat member is greater than the height of said housing portion.

19. Solar energy conversion apparatus according to claim 1 wherein said flat sections of said dome member extend upwardly from the longitudinal edges of the pan member toward one another at angles between about 20° and 30° to said flat member.

* * * * *